United States Patent
Dehennau et al.

(10) Patent No.: US 7,851,042 B2
(45) Date of Patent: Dec. 14, 2010

(54) PLANE STRUCTURE COMPOSED OF A COHESIVE ASSEMBLY OF CONTIGUOUS CELLULAR CELLS

(75) Inventors: Claude Dehennau, Waterloo (BE); Dominique Grandjean, Brussels (BE); Philippe-Jacques Leng, Brussels (BE)

(73) Assignee: SOLVAY (Societe Anonyme), Brussels (BE)

( * ) Notice: Subject to any disclaimer, the term of this patent is extended or adjusted under 35 U.S.C. 154(b) by 477 days.

(21) Appl. No.: 11/910,561

(22) PCT Filed: Apr. 4, 2006

(86) PCT No.: PCT/EP2006/061293

§ 371 (c)(1),
(2), (4) Date: Nov. 28, 2007

(87) PCT Pub. No.: WO2006/106101

PCT Pub. Date: Oct. 12, 2006

(65) Prior Publication Data

US 2008/0193711 A1    Aug. 14, 2008

(30) Foreign Application Priority Data

Apr. 5, 2005  (FR) .................................. 05 03353

(51) Int. Cl.
  *B32B 3/12*  (2006.01)
  *B29C 39/02*  (2006.01)
(52) U.S. Cl. .................. 428/116; 264/294; 428/118; 428/192; 428/194; 428/338

(58) Field of Classification Search ................ None
See application file for complete search history.

(56) References Cited

U.S. PATENT DOCUMENTS

| | | | |
|---|---|---|---|
| 4,657,497 A | 4/1987 | Dehennau et al. | |
| 6,177,036 B1 * | 1/2001 | Van Der Hoeven et al. | 264/45.9 |
| 2006/0219354 A1 | 10/2006 | Dehennau et al. | |

FOREIGN PATENT DOCUMENTS

| | | |
|---|---|---|
| FR | 2 760 999 | 9/1998 |
| WO | 00/32382 | 6/2000 |
| WO | 2005/014265 | 2/2005 |

OTHER PUBLICATIONS

U.S. Appl. No. 11/915,770, filed Nov. 28, 2007, Dehennau, et al.
Rauwendaal, Chris, "Polymer Extrustion", Hanser Publishers, pp. 455-456 (1990 reprint edition).
U.S. Appl. No. 11/577,557, filed Apr. 19, 2007, Dehennau, et al.
U.S. Appl. No. 12/063,148, filed Feb. 7, 2008, Dehennau, et al.
U.S. Appl. No. 12/094,900, filed May 23, 2008, Dehennau, et al.
U.S. Appl. No. 12/293,305, filed Sep. 17, 2008, Dehennau, et al.

* cited by examiner

*Primary Examiner*—Ling Xu
(74) *Attorney, Agent, or Firm*—Oblon, Spivak, McClelland, Maier & Neustadt, L.L.P.

(57) ABSTRACT

Plane structure composed of a cohesive assembly of contiguous cellular cells having any cross section and essentially parallel walls from one cell to another, characterized in that the walls of the cells comprise at least two portions based on different polymeric compositions, the junction between said portions being substantially parallel to the plane of the structure.

11 Claims, 2 Drawing Sheets

Figure 5:
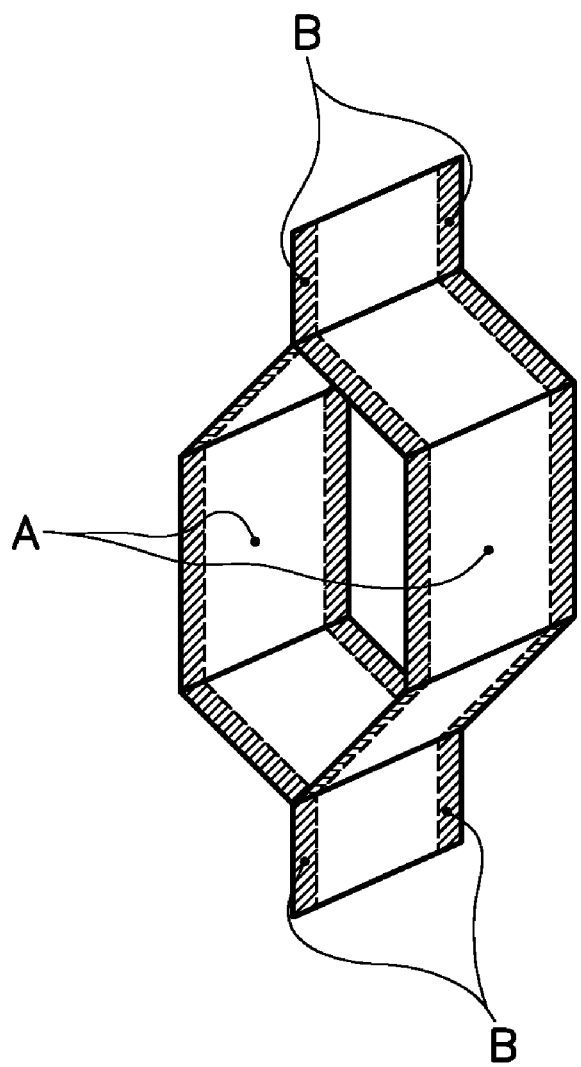

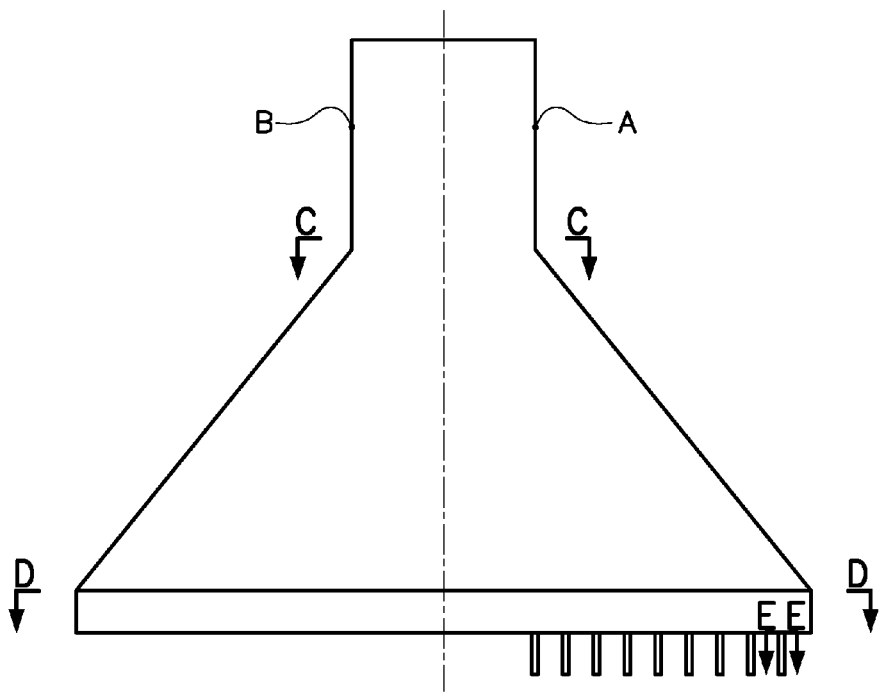
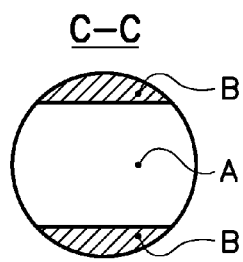
Fig. 1
Fig. 2
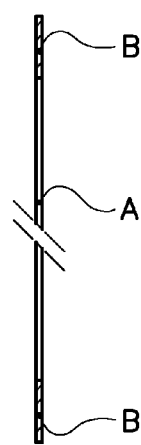
Fig. 3
Fig. 4

PLANE STRUCTURE COMPOSED OF A COHESIVE ASSEMBLY OF CONTIGUOUS CELLULAR CELLS

This application is a 371 of PCT/EP2006/061293, filed Apr. 4, 2006.

The present invention relates to a plane structure composed of a cohesive assembly of contiguous cellular cells (or honeycomb) and to a process and a device that are suitable for manufacturing such a structure.

In many industrial applications, such as for example panels for buildings, or panels for the internal lining of land, sea or air vehicles, it is desirable to have composite panels that are lightweight and inexpensive, whilst still having good mechanical properties, in particular as regards their impact strength and flexural strength. Preferably, these mechanical properties must not be excessively affected by temperatures of around 60 to 100° C., which are commonly reached near propulsion or heating devices, or else when a vehicle or an unventilated wall is exposed to the sun. Such panels that are very suitable are those having a honeycomb core.

To be economically profitable, these panels must be produced with simple rapid processes that include the fewest number possible of steps and, from this standpoint, the choice of polymers (particularly thermoplastic polymers) as constituent materials is also judicious. This is because, owing to their thermoplasticity, these materials may be fashioned into a honeycomb structure in a single step, or at most in two steps.

Thus, one process for manufacturing cellular structures by continuous extrusion has been proposed in Application FR 2 760 999, whereas Application WO 00/32382 in the name of the Applicant describes a process for obtaining such structures by the thermoforming and folding of a preformed sheet.

To meet the impact strength and rigidity criteria, honeycomb-type structures are often covered on both sides of their planes with facings made of various thermoplastics in order to produce panels. To assemble such panels, it is general practice to use either an adhesive (WO 00/32382) or to use thermal-welding (FR 2 760 999) or electromagnetic-radiation (WO 2005/014265) methods.

However, it is necessary in both cases for the polymers making up the honeycomb and the facings to be of the same chemical family or to adhere to each other. When the adhesion is insufficient, it is necessary to use, as insert, an adhesive film or "nonwoven" film that serves as anchoring surface between the two product families. At the present time, honeycombs are always composed of a single polymer or a single polymeric formulation, which requires the use of insert films each time panels of complex structure are produced. This is for example the case when facings made of glass-fibre-reinforced PP are bonded to PP or PVC honeycombs or when PVC or polyester facings are bonded to PO honeycombs. Now, the use of an insert film is often expensive and requires an additional step of fastening the film to the facings.

The object of the present invention is to solve this problem by proposing a particular honeycomb structure which may be suitable for the fastening of facings differing in nature from the main constituent material of the cells.

One subject of the present invention is therefore a plane structure composed of a cohesive assembly of contiguous cellular cells having any cross section and essentially parallel walls from one cell to another, characterized in that the walls of the cells comprise at least two portions based on different polymeric compositions, the junction between said portions being substantially parallel to the plane of the structure.

The term "cells" is understood to mean open or closed cells having any cross section, generally a circular or hexagonal cross section, with essentially parallel walls from one cell to another. In the case of hexagonal cells for example, this is understood to mean that the portions of homologous walls are parallel from one cell to another.

According to the invention, these walls comprise at least two portions based on different polymeric compositions, the junction of which is substantially parallel to the plane of the structure. Each cell is therefore as it were formed from at least two different cells that are superposed and welded together.

The term "polymeric composition" is understood to mean a composition comprising at least one polymer and optionally one or more additives.

The polymer may be any thermoplastic polymer or elastomer, whether a homopolymer or copolymer (especially a binary or ternary copolymer), and also a blend of such polymers. Examples of copolymers used are random copolymers, linear block copolymers, other block copolymers and graft copolymers.

In particular, any type of thermoplastic polymer or copolymer whose melting point is below the decomposition temperature is suitable. It is also possible to make use of synthetic thermoplastics exhibiting polydispersity in their molecular weight and having a melting range spread over at least 10° C.

Thus, the following may be used, but without being limited thereby: polyolefins, polyvinyl halides (PVC-PVDF), thermoplastic polyesters, aliphatic or aromatic polyphenyl sulphones (PPSU), polyketones, polyamides (PA), polycarbonates and copolymers thereof.

As possible additives for these polymers, mention may be made of pigments, fillers, especially fibrous or particulate fillers, stabilizers, plasticizers, fire retardants, antioxidants, antistatic agents, compatibilizing agents, coupling agents, blowing agents, etc.

In particular, the use of a thermoplastic with a blowing (or foaming) agent makes it possible to obtain a particularly lightweight structural element. The blowing agent may be a "physical" blowing agent, that is to say a gas dissolved under pressure in the material, causing it to expand as it leaves the extruder. Examples of such gases are $CO_2$, nitrogen, water vapour, hydrofluorocarbons (such as the mixture sold by Solvay under the trade mark SOLKANE® XG87, comprising 87% $CF_3CH_2F$ by weight and 13% $CH_2CH_3$ by weight), hydrocarbons (such as butanes or pentane) or a mixture thereof. It may also be what is called a "chemical" blowing agent, that is to say a substance (or a mixture of substances) dissolved or dispersed in the material, which, under the effect of temperature, releases the gas or gases that will be used for the expansion. Examples of such substances are azodicarbonamide and sodium bicarbonate/citric acid mixtures. A mixture of the two types of blowing agent may also be suitable.

Cellulose particles may be added to the thermoplastic polymers as fillers, for the purpose of reinforcing and/or reducing the cost of the structure. The term "cellulose particles" is understood in particular to mean sawdust, wood flour, wood fibres, paper or board particles, plant fibres such as flax, cotton or bamboo fibres, straw waste, and mixtures thereof. Such particles preferably have their longest dimension (length) about 0.1 to 3 mm on average. It is desirable for the water content not to exceed 15% by weight. To improve the adhesion of the cellulose particles to the constituent thermoplastic, it may be useful to compatibilize them, for example by the addition of a small amount of compatibilizing agents such as unsaturated organosilanes (vinyltriethoxysilane, γ-methacryloxypropyltrimethoxysilane, etc.), and also possibly one or more peroxides. The effect of such compatibilizing agents may be further enhanced by the combined use of small amounts of suitable crosslinking agents, for example triacrylates, tetraacrylates or pentaacrylates of polyols. Another method of compatibilization consists in using a thermoplastic comprising one or more modified polymers so as to exhibit greater affinity with respect to the cellulose particles, such as a maleic-anhydride-grafted polyolefin.

The concentration of cellulose particles within the thermoplastic is generally at least 15 parts, preferably at least 50 parts, by weight (per 100 parts by weight of thermoplastic). Moreover, this concentration is generally at most 250 parts and preferably at most 150 parts.

The cells of the structure according to the invention may comprise three portions based on at least two different polymeric compositions, the junctions of which are substantially (that is to say to within a few degrees and over at least 75%, or even at least 90%, of their length) parallel to the plane of the structure. One structure that is very suitable is that in which the wall of each cell is formed from three portions with a central portion of a given composition and two end portions. Preferably, the two end portions are based on the same composition, which is different from that of the central portion. Preferably, the end portions are minor portions in terms of extent (and therefore represent less than 50% of the height of the wall) and represent, for example, less than 30%, preferably less than 10% and even more preferably less than 1%, of the height of the wall.

According to one variant of the invention, the end portions are based on a polymeric composition having a flexural modulus different from that of the polymeric composition of the central portion. This is because, for some applications, it may be advantageous in order to increase the flexural strength of the structure to use, for the two end portions, a polymeric composition having a higher flexural modulus than that of the polymeric composition used for the central portion. Conversely, in particular for increasing the impact strength and giving the structure a "soft" feel, it may be advantageous to use for the two end portions a polymeric composition having a lower flexural modulus than that of the polymeric composition used for the central portion.

As mentioned above, the role of these end portions may be to promote the adhesion of facings on each side of the structure. It may also prove to be beneficial, for some applications, to simply wish to protect the cells from any knocks and contaminations before the facings are bonded. In this case, the polymer constituting the outer portions will be chosen so as to be able to be debonded by delamination from the central portion (that is to say by being mechanically detached therefrom without damaging it) just before the facings are laid.

When the outer portions are intended to serve as adhesive layer for facings, the polymeric compositions used in these layers preferably comprise coextrusion adhesives. It will be preferable to choose the copolymers or terpolymers sold under the trade mark LOTADER®, maleic-anhydride-grafted polyolefins sold under the trade mark PRIEX®, or ionomers also sold under the trade mark PRIEX®.

It should also be noted that all the cells of the structure do not necessarily have the same composition. Thus, for example, some cells may have at least one portion differing in nature from its neighbours.

The present invention also relates to a process for manufacturing cellular structures as described above and consisting in feeding an upstream die by means of a coextrusion feed block (such as that described in U.S. Pat. No. 4,657,497 in the name of the Applicant, the content of which is incorporated for reference in the present application), said upstream die feeding a downstream die (such as that described in patent FR 2 760 999, the content of which is also incorporated for reference into the present application) with at least two juxtaposed (superposed) bands of polymers. The upstream die distributes the thermoplastic in the melt state along a flat sheet over the entry width into the downstream die. The latter is used to form the flat sheet of melt produced by the upstream die into a three-dimensional profile providing the structural element.

In other words, the present invention relates to a process for the manufacture of a structure as described above, which process comprises the following steps:
  a first ("upstream") flat die is fed, by means of a coextrusion block, with at least two different polymeric compositions, and a flat sheet of polymer melt, comprising two welded bands based on said compositions is manufactured by means of this die; and
  this sheet is converted, by means of a second ("downstream") die, into a three-dimensional profile which, after cooling, constitutes the structure.

Another way of satisfying the invention is to use, as upstream flat die, a "multichannel" flat die comprising at least two separate channels that junction up just before the entry of the melt into the downstream die; such dies are for example described in "Polymer Extrusion" by Chris Rauwendaal, Hanser Publishers, pp. 455-6 (1990 reprint edition).

In other words, the present invention also relates to a process for the manufacture of a structure as described above, which process comprises the following steps:
  a second ("downstream") die is fed, by means of a first ("upstream") flat die, with two contiguous flat streams based on two different molten polymeric compositions; and
  these two streams are converted, by means of a second ("downstream") die, into a three-dimensional profile which, after cooling, constitutes the structure.

Finally, the present invention also relates to a device for implementing the process as described above.

This device is characterized in that it comprises two dies:
  a first ("upstream") flat die capable of manufacturing a sheet comprising two, contiguous or welded, flat streams based on two different molten polymeric compositions; and
  a second ("downstream") die capable of converting this sheet into a three-dimensional profile which, after cooling, constitutes the structure.

The present invention is illustrated in a non-limiting manner by FIGS. 1 to 5.

FIG. 4 illustrates an extruder 30 mm in diameter and an extruder 20 mm in diameter that feed, with natural PVC (layer A) and with black PVC (layer B) respectively, a coextrusion feed block as described in FIGS. 2, 3 and 4 of U.S. Pat. No. 4,657,497. This block feeds a B/A/B three-layer stream of material (see FIG. 1) into an upstream die, which is a flat die 4 cm in width suitable for the flow of PVC. This upstream die converts the three-layer stream into a flat band composed of three layers B/A/B of polymer melts (see FIG. 2), which are fed into a downstream die; the latter converts the flat three-layer band into vertical bands composed of three bands of materials B/A/B (see FIG. 3). These bands are welded together, upon exiting the downstream die, by a system for creating an alternate pressure/vacuum between two adjacent bands, so as to provide a honeycomb, polymer B of which is on the two surfaces of the honeycomb and polymer A of which is at the centre of the vertical walls (see FIG. 5). The ratio of the heights of the bands A and B is proportional to the ratio of the outputs of the extruders feeding polymer A and polymer B modulated according to the choice of geometry of the feed block and the differences in viscosity of polymers A and B. External facings may then be deposited on polymer B, on each side of the honeycomb, by any known, continuous or batch, process, especially by hot pressing or lamination, on the honeycomb, by welding using a laser beam.

The invention claimed is:

1. A plane structure comprising a cohesive assembly of continuous cellular cells having a hexagonal cross section and essentially parallel walls from one cell to another, wherein the walls of the cells are formed from bands that comprise at least two portions comprising different polymeric compositions and which are welded together in a honeycomb structure, the junction between said band portions comprising different polymeric compositions being substantially parallel to the plane of the structure.

2. The structure according to claim 1, wherein the walls of the cells comprise three portions based on at least two different polymeric compositions, the junctions of which are substantially parallel to the plane of the structure.

3. The structure according to claim 1, wherein the bands comprise a central portion of a first composition and two end portions, the end portions each having the same polymeric composition as one another, but different from that of the central portion.

4. The structure according to claim 3, wherein the end portions represent less than 50% of the height of the band forming the wall of the cells.

5. The structure according to claim 3, wherein the polymeric composition of the end portions has a flexural modulus different from that of the polymeric composition of the central portion.

6. The structure according to claim 3, wherein the end portions may be debonded by delamination from the central portion.

7. The structure according to claim 3, wherein the polymeric compositions of the end portions comprise coextrusion adhesives.

8. The structure according to claim 3, wherein the end portions represent less than 10% of the height of the band forming the wall of the cells.

9. The structure according to claim 3, wherein the end portions represent less than 1% of the height of the band forming the wall of the cells.

10. A process for manufacturing a structure according to claim 1, comprising:
    feeding a first upstream flat die by a coextrusion block with at least two different polymeric compositions to produce a flat sheet of polymer melt, comprising bands based on said compositions; and
    converting this sheet by a second downstream die into a three-dimensional honeycomb profile.

11. A process for manufacturing a structure according to claim 10, comprising:
    a second downstream die is fed by a first upstream flat die with two contiguous flat streams based on two different molten polymeric compositions; and
    these two streams are converted by the second downstream die into a three-dimensional honeycomb profile.

* * * * *